United States Patent
Nightingale et al.

(10) Patent No.: US 9,424,019 B2
(45) Date of Patent: Aug. 23, 2016

(54) UPDATING HARDWARE LIBRARIES FOR USE BY APPLICATIONS ON A COMPUTER SYSTEM WITH AN FPGA COPROCESSOR

(75) Inventors: Edmund B. Nightingale, Redmond, WA (US); Brian LaMacchia, Seattle, WA (US); Paul Barham, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/528,329

(22) Filed: Jun. 20, 2012

(65) Prior Publication Data

US 2013/0346669 A1    Dec. 26, 2013

(51) Int. Cl.
*G06F 9/445* (2006.01)
*G06F 15/78* (2006.01)

(52) U.S. Cl.
CPC .............. *G06F 8/65* (2013.01); *G06F 9/44521* (2013.01); *G06F 15/7871* (2013.01)

(58) Field of Classification Search
None
See application file for complete search history.

(56) References Cited

U.S. PATENT DOCUMENTS

| | | | |
|---|---|---|---|
| 5,748,979 A | 5/1998 | Trimberger |
| 5,752,035 A | 5/1998 | Trimberger |
| 5,915,025 A | 6/1999 | Taguchi et al. |
| 6,557,156 B1 | 4/2003 | Guccione |
| 6,704,816 B1 | 3/2004 | Burke |
| 6,823,069 B1 | 11/2004 | Kitajima et al. |
| 6,907,126 B2 | 6/2005 | Inada |
| 6,941,538 B2 | 9/2005 | Hwang et al. |
| 7,028,283 B1 | 4/2006 | Keller et al. |
| 7,134,025 B1 | 11/2006 | Trimberger |
| 7,512,813 B2 | 3/2009 | Goodnow et al. |
| 7,587,699 B2 | 9/2009 | McCubbrey |
| 7,669,168 B1 | 2/2010 | Patterson |
| 7,702,927 B2 | 4/2010 | Devadas et al. |
| 7,711,964 B2 | 5/2010 | Van Essen et al. |
| 7,788,502 B1 | 8/2010 | Donlin et al. |
| 7,870,223 B2 | 1/2011 | Grgic et al. |

(Continued)

FOREIGN PATENT DOCUMENTS

| | | |
|---|---|---|
| CN | 1284681 | 2/2001 |
| CN | 2650231 | 10/2004 |

(Continued)

OTHER PUBLICATIONS

Office Action dated Feb. 13, 2015 cited in U.S. Appl. No. 13/528,175.

(Continued)

*Primary Examiner* — Chuck Kendall
(74) *Attorney, Agent, or Firm* — Aneesh Mehta; Ramesh Kuchibhatla; Micky Minhas

(57) ABSTRACT

A computer system includes one or more field programmable gate arrays as a coprocessor that can be shared among processes and programmed using hardware libraries. Given a set of hardware libraries, an update process periodically updates the libraries and/or adds new libraries. One or more update servers can provide information about libraries available for download, either in response to a request or by notifying systems using such libraries. New available libraries can be presented to a user for selection and download. Requests for updated libraries can arise in several ways, such as through polling for updates, exceptions from applications attempting to use libraries, and upon compilation of application code.

20 Claims, 7 Drawing Sheets

(56) References Cited

U.S. PATENT DOCUMENTS

| | | | |
|---|---|---|---|
| 7,908,476 B2 | 3/2011 | Kandasamy et al. | |
| 7,975,062 B2 | 7/2011 | Krikorian et al. | |
| 8,065,517 B2 | 11/2011 | Cizas et al. | |
| 8,230,374 B2 | 7/2012 | McCubbrey | |
| 8,369,460 B1 | 2/2013 | Su | |
| 8,417,965 B1 | 4/2013 | Sundararajan et al. | |
| 8,448,122 B1 | 5/2013 | Suthar et al. | |
| 8,516,268 B2 | 8/2013 | Woodall | |
| 8,612,409 B2 | 12/2013 | Tomkins et al. | |
| 8,620,967 B2 | 12/2013 | Wessling | |
| 8,620,996 B2 | 12/2013 | Athale et al. | |
| 8,621,008 B2 | 12/2013 | Chebiyyam | |
| 8,627,052 B2 | 1/2014 | Mohrmann et al. | |
| 2001/0037457 A1 | 11/2001 | Inada | |
| 2001/0043082 A1 | 11/2001 | Wittig et al. | |
| 2002/0055947 A1 | 5/2002 | Schultz et al. | |
| 2003/0086300 A1 | 5/2003 | Noyes et al. | |
| 2003/0110463 A1 | 6/2003 | Kuhlmann et al. | |
| 2003/0172303 A1 | 9/2003 | Adusumilli | |
| 2004/0019765 A1 | 1/2004 | Klein, Jr. | |
| 2004/0049672 A1 | 3/2004 | Nollet et al. | |
| 2004/0060032 A1 | 3/2004 | McCubbrey | |
| 2004/0123258 A1 | 6/2004 | Butts | |
| 2004/0230934 A1 | 11/2004 | Taylor et al. | |
| 2006/0015313 A1 | 1/2006 | Wang et al. | |
| 2006/0015862 A1* | 1/2006 | Odom et al. | 717/168 |
| 2006/0059373 A1 | 3/2006 | Fayad et al. | |
| 2006/0156406 A1 | 7/2006 | Bantz et al. | |
| 2007/0074045 A1 | 3/2007 | Van Essen et al. | |
| 2007/0129818 A1 | 6/2007 | Andrade et al. | |
| 2007/0277161 A1 | 11/2007 | Herbordt et al. | |
| 2008/0104601 A1 | 5/2008 | Kaneko et al. | |
| 2008/0133899 A1 | 6/2008 | Park et al. | |
| 2009/0119503 A1 | 5/2009 | Isaakian et al. | |
| 2009/0282386 A1 | 11/2009 | Moir et al. | |
| 2009/0288076 A1* | 11/2009 | Johnson et al. | 717/168 |
| 2009/0293051 A1* | 11/2009 | Krywaniuk | 717/173 |
| 2010/0202239 A1 | 8/2010 | Moshayedi et al. | |
| 2010/0293356 A1 | 11/2010 | Plunkett et al. | |
| 2011/0145780 A1 | 6/2011 | Chen | |
| 2011/0153981 A1 | 6/2011 | Yancey et al. | |
| 2012/0047371 A1 | 2/2012 | Woodall | |
| 2012/0117549 A1 | 5/2012 | Doyle et al. | |
| 2012/0191967 A1 | 7/2012 | Lin et al. | |
| 2013/0346758 A1 | 12/2013 | LaMacchia et al. | |
| 2013/0346759 A1 | 12/2013 | LaMacchia et al. | |
| 2013/0346979 A1 | 12/2013 | Nightingale et al. | |
| 2013/0346985 A1 | 12/2013 | Nightingale | |

FOREIGN PATENT DOCUMENTS

| | | |
|---|---|---|
| CN | 101222743 | 7/2008 |
| CN | 201371945 | 12/2009 |
| CN | 102087600 | 6/2011 |
| CN | 102119390 | 7/2011 |
| CN | 102324006 | 1/2012 |
| CN | 102377564 | 3/2012 |
| EP | 1930834 A1 | 6/2008 |

OTHER PUBLICATIONS

Notice of Allowance dated May 13, 2015 cited in U.S. Appl. No. 13/528,400.

Office Action dated Jun. 3, 2015 cited in U.S. Appl. No. 13/528,251.

"International Search Report & Written Opinion for PCT Patent Application No. PCT/US2013/046418", Mailed Date: Sep. 11, 2013, Filed Date: Jun. 18, 2013, 11 pages.

Frigo et al., "Evaluation of the Streams-C C-to-FPGA Compiler: An Applications Perspective", Feb. 13, 2001, Copyright 2001 ACM, (Frigo_2001.pdf; pp. 1-7).

Lysecky et al., "Dynamic FPGA Routing for Just-in-Time FPGA compilation", University of California, Jun. 11, 2004; (Lysecky_2004.pdf; pp. 1-6).

David Max Meisner, "Design of a shared hardware library for multi-core environments in FPGA fabrics", Honor Thesis submitted to Brown University, Apr. 24, 2007; (Meisner_2007; pp. 1-48).

"International Search Report & Written Opinion for PCT patent Application No. PCT/US2013/046881", Mailed Date: Nov. 29, 2013, Filed Date: Jun. 20, 2013, 9 pages.

"International Search Report & Written Opinion for PCT Patent Application No. PCT/US2013/046871", Mailed Date: Oct. 15, 2013, Filed Date: Jun. 20, 2013, 9 pages.

U.S. Appl. No. 13/528,175, Apr. 11, 2014, Office Action.

U.S. Appl. No. 13/528,251, Jun. 6, 2014, Office Action.

U.S. Appl. No. 13/528,400, Sep. 13, 2013, Office Action.

U.S. Appl. No. 13/528,400, Jun. 16, 2014, Office Action.

U.S. Appl. No. 13/528,438, Sep. 16, 2014, Office Action.

U.S. Appl. No. 13/528,438, Apr. 16, 2014, Notice of Allowance.

Office Action dated Nov. 6, 2014 cited in U.S. Appl. No. 13/528,251.

Office Action dated Nov. 7, 2014 cited in U.S. Appl. No. 13/528,400.

Notice of Allowance dated Jul. 29, 2014 cited in U.S. Appl. No. 13/528,438.

Office Action dated Oct. 17, 2014 cited in U.S. Appl. No. 13/528,175.

Shibamura, et al., "Express-1: A Dynamically Reconfigurable Platform Using Embedded Processor FPGA", In IEEE International Conference on Field-Programmable Technology, Dec. 6, 2004, 8 Pages.

Huang, et al., "Function-Level Multitasking Interface Design in an Embedded Operating System with Reconfigurable Hardware", In Proceedings of the International Conference on Embedded and Ubiquitous Computing, Dec. 17, 2007, 22 Pages.

Vuletic, et al., "Seamless Hardware-Software Integration in Reconfigurable Computing Systems", In IEEE Design & Test of Computers, vol. 22, Issue 2, Mar. 2005, 12 Pages.

Marescaux, et al., "Run-Time Support for Heterogeneous Multitasking on Reconfigurable SoCs", In Integration, the VLSI Journal—Special Issue: Networks on Chip and Reconfigurable Fabrics, vol. 38, Issue 1, Oct. 2004, 24 Pages.

"International Search Report Written Opinion for PCT Patent Application No. PCT/US2013/046719", Mailed Date: Sep. 11, 2013, Filed Date: Jun. 20, 2013, 10 Pages.

First Office Action Issued in Chinese Patent Application No. 201310248192.3, Mailed Date: Oct. 10, 2015, 14 Pages.

Notice of Allowance dated Aug. 31, 2015 cited in U.S. Appl. No. 13/528,400.

Jain, et al., "Speeding Up Program Execution Using Reconfigurable Hardware and a Hardware Function Library", In Proceedings of Eleventh International Conference on VLSI Design, Jan. 1998, 6 pages.

Office Action dated Oct. 26, 2015 cited in U.S. Appl. No. 13/528,175 (Copy Attached).

Notice of Allowance dated Nov. 19, 2015 cited in U.S. Appl. No. 13/528,251 (Copy Attached).

First Office Action Received in Chinese Patent Application No. 201310245064.3, Mailed Date: Dec. 24, 2015, 14 Pages.

First Office Action and Search Report Issued in Chinese Patent Application No. 201310248194.2, Mailed Date: Jan. 13, 2016, 13 Pages.

* cited by examiner

UPDATING HARDWARE LIBRARIES FOR USE BY APPLICATIONS ON A COMPUTER SYSTEM WITH AN FPGA COPROCESSOR

BACKGROUND

In most general purpose computers, an operating system is the primary software that manages access to resources within the computer. The primary resources are the central processing unit (CPU), which executes application programs designed to run on the computer, main memory and storage. In some computer architectures, additional processing units (such as multiple cores in a processor) and/or additional processors, called co-processors, may be present. Examples of such co-processors include a graphic processing unit (GPU) and a digital signal processor (DSP). The operating system also manages access to these resources by multiple processes.

A field programmable gate array (FPGA) is a kind of logic device that is commonly used in specialized computing devices. An FPGA typically is used to perform a specific, dedicated function, for which a gate array is particularly well-suited. FPGAs typically are found in peripheral devices, or other specialized hardware, such as a printed circuit board connected to and accessed through a system bus such as a PCI bus. In general, such devices are programmed once, and used many times. Because these devices are programmable, they have an advantage over other specialized logic devices in that they can be updated in the field.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One or more field programmable gate arrays (FPGA) can be used as a shared programmable co-processor resource in a general purpose computing system. An FPGA can be programmed to perform functions, which in turn can be associated with one or more processes. With multiple processes, the FPGA can be shared, and a process is assigned to at least one portion of the FPGA during a time slot in which to access the FPGA. Programs written in a hardware description language for programming the FPGA are made available as a hardware library. The operating system manages allocating the FPGA resources to processes, programming the FPGA in accordance with the functions to be performed by the processes using the FPGA and scheduling use of the FPGA by these processes.

Given a set of hardware libraries in a system, an update process can be provided to periodically (or, on request) update the libraries to add new libraries or change existing libraries to new versions. One or more update servers can provide information about libraries available for download, either in response to a request or by notifying systems using such libraries. New available libraries can be presented to a user for selection and download. Requests for updated libraries can arise in several ways, such as through polling for updates, exceptions from applications attempting to use libraries, and upon compilation of application code.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides a brief, general description of an example computing environment in which an operating system for managing use of FPGA resources can be implemented. The system can be implemented with numerous general purpose or special purpose computing devices. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 1:
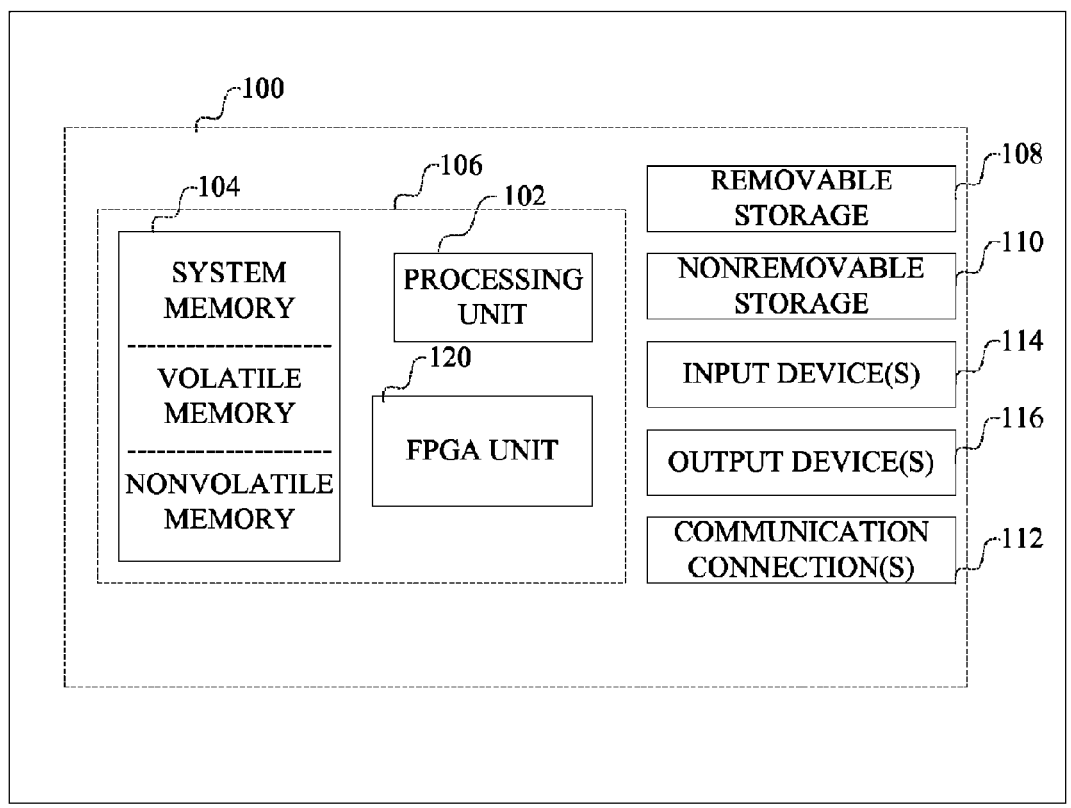
FIG. 1 is a block diagram of an example computing system with FPGA resources for which an operating system can be implemented.

FIG. 1 illustrates merely an example computing environment, and is not intended to suggest any limitation as to the scope of use or functionality of a suitable computing environment.

With reference to FIG. 1, an example computing environment includes a computing device 100. In a basic configuration, computing device 100 includes at least one processing unit 102, such as a typical central processing unit (CPU) of a general purpose computer, and memory 104.

The computing device may include multiple processing units and/or additional co-processing units such as a graphics processing unit (GPU). The computing device also includes one or more field programmable gate arrays (FPGA), denoted as FPGA unit 120 which is available as a shared (among processes running on the computer) co-processing resource. An FPGA may reside in its own CPU socket or on a separate card plugged into an expansion slot, such as a Peripheral Component Interconnect Express (PCI-E) slot. By providing such an FPGA unit, a variety of functions that are well-suited for implementation by a gate array can be implemented with the resulting benefit of hardware acceleration.

Depending on the configuration of the processing unit and the FPGA unit, the unit, or each functional unit within it, has an associated input/output channel for communication with host operating system processes. For example, a memory region dedicated to the functional unit and shared between it and a process using that functional unit can be provided. A sort of request queue and response queue also can be used to enable asynchronous invocation of operations implemented in the FPGA unit. Additionally, state of the functional units in the FPGA unit for a process can be saved to and restored from a memory region for the functional unit and that process. Alternatively other techniques can be used to ensure that the functional unit is in a known state before it is used by its process.

Depending on the configuration and type of computing device, memory 104 may be volatile (such as RAM), nonvolatile (such as ROM, flash memory, etc.) or some combination of the two. This configuration of a processing unit, co-processor and memory is illustrated in FIG. 1 by dashed line 106.

Computing device 100 may also have additional resources and devices. For example, computing device 100 may include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer program instructions, data files, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 also can include communications connection(s) 112 that allow the device to communicate with other devices over a communication medium. The implementation of the communications connection 112 is dependent on the kind of communication medium being accessed by the computing device, as it provides an interface to such a medium to permit transmission and/or reception of data over the communication medium. A communication medium typically carries computer program instructions, data files, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing device 100 may have various input device(s) 114 such as a keyboard, mouse, pen, camera, touch input device, and so on. Output device(s) 116 such as a display, speakers, a printer, and so on may also be included. All of these devices are well known in the art and need not be discussed at length here.

Applications executed on a computing device are implemented using computer-executable instructions and/or computer-interpreted instructions, such as program modules, that are processed by the computing device. Generally, program modules include routines, programs, objects, components, data structures, and so on, that, when processed by a processing unit, instruct the processing unit to perform particular tasks or implement particular abstract data types. In a distributed computing environment, such tasks can be performed by remote processing devices that are linked through a communications network. In a distributed computing environment, program modules may be located in both local and remote computer storage media including memory storage devices.

An operating system executed on a computing device manages access to the various resources of the computer device by processes. Typically, running an application on the computer system causes one or more processes to be created, with each process being allocated to different resources over time. If a resource is shared among processes, and if the processes cannot share the resource concurrently, then the operating system schedules access to the resource over time. One of such resources is the FPGA unit 120 of FIG. 1, which can include one or more discrete FPGA's.

Figure 2:
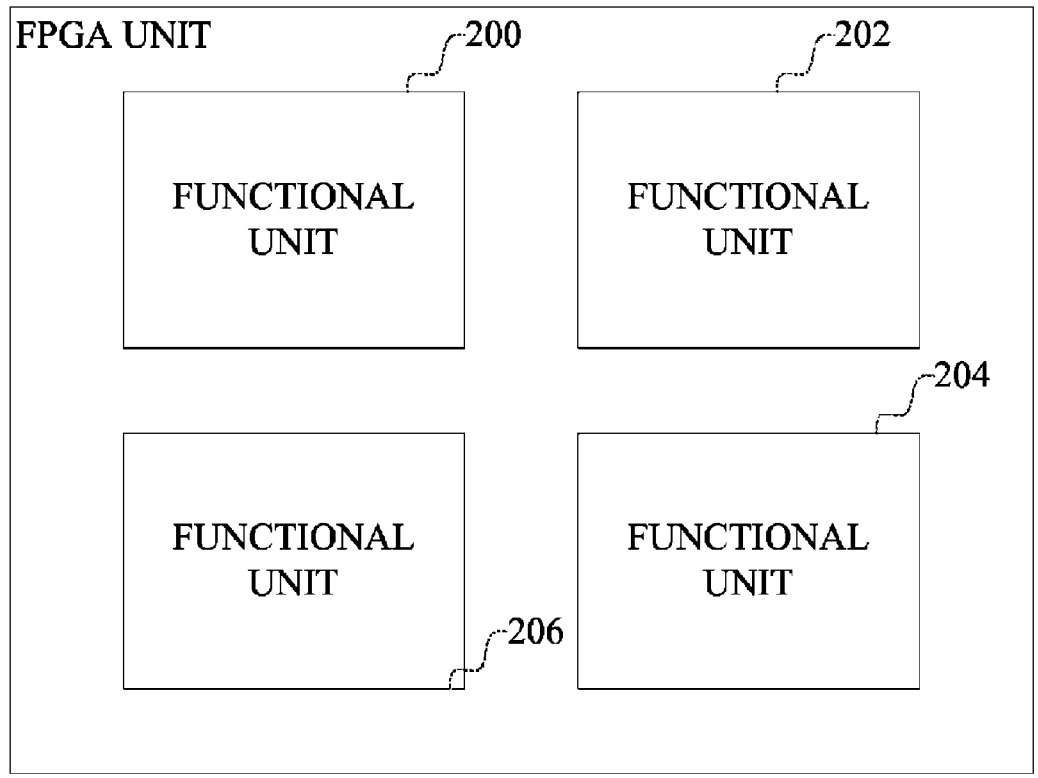
FIG. 2 is a schematic diagram of an illustrative example of FPGA functional units.
Figure 3:
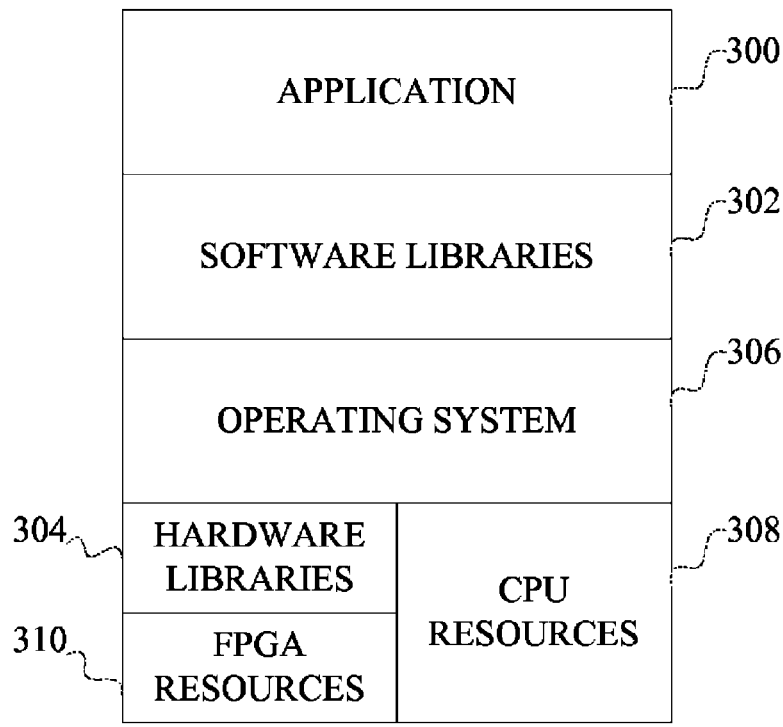
FIG. 3 is a schematic diagram of an example architecture of an application using hardware and software libraries on a computer system with FPGA resources.

Referring to FIG. 2, one of the resources within the FPGA unit is one or more groups of programmable gates, herein called functional units. Each functional unit is defined by a set of gates and/or other resources in the gate array. In general, functional units are nonoverlapping, i.e., do not share programmable elements within the gate array. For example, as illustrated schematically in FIG. 2, functional units 200, 202, 204 and 206 are non-overlapping. Most FPGAs have only one functional unit. The FPGA unit 120 in FIG. 1, however, can have one or more FPGAs. With multiple FPGAs, each FPGA can be considered a functional unit. Referring to FIG. 3, each functional unit is a resource that can be assigned to one or more processes, programmed by the operating system using a hardware library that implements an operation, and then used by the processes assigned to it to perform the operation. Referring to FIG. 3 as an example, an application 300 can use conventional software libraries 302, and FPGA hardware libraries 304, to perform various operations. If an application relies on a hardware library 304, then the operating system 306 uses the hardware library to program the FPGA resources 310 to allow the application 300 to use the library. The FPGA can be programmed prior to the application beginning execution. If an FPGA can be reprogrammed quickly enough, the library can be loaded into the FPGA in a scheduling quantum of the operating system. The operating system 306 also executes software commands from the application 300 and software libraries 302 on the CPU 308. When the application makes calls to functions performed by a software library, the operating system executes the function from the software library on the CPU 308. When the application makes calls to functions performed by the FPGA, the operating system ensures that the FPGA is programmed using the hardware library and executes the function using the FPGA.

Figure 4:
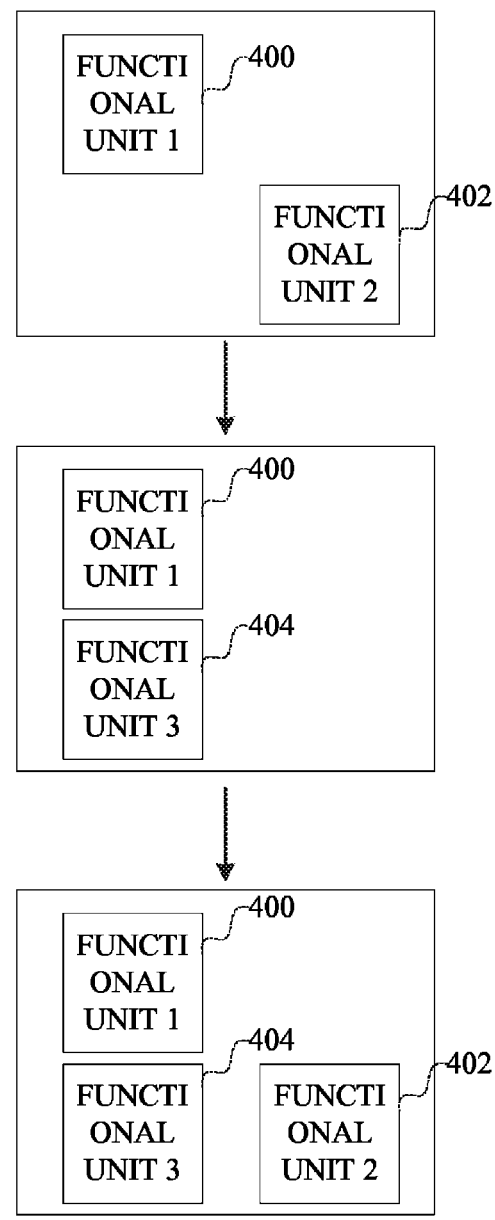
FIG. 4 is a diagram illustrating the use of FPGA resources over time.

To illustrate how different functional units can be used over time, reference is now made to FIG. 4. In FIG. 4, at time T1, functional units 400 and 402 are being used. At time T2, functional units 400 and 404 are being used. At time T3, functional units 400 and 402 are again being used. At time T1, functional unit 400 can be assigned to process P1, and functional unit 402 can be assigned to process P2. At time T2, process P2 may be inactive, and process P1 can use functional unit 400 and process P3 can use functional unit 404. At time T3, another process can start using functional unit 400, such as process P4; and process P2 can be active again at use functional unit 402. With current FPGA implementations, the use of multiple functional units at the same time by different processes implies the use of multiple FPGAs. To the extent that an FPGA can support multiple functional units being used by different processes at the same time, these functional units can be on the same FPGA. Effectively, the operating system is statistically multiplexing the FPGA in both time and space.

To allow such usage of the FPGA resources by different processes over time, the operating system has a scheduler that determines which process has access to the FPGA resources at each scheduling quantum, i.e., time period, and when an FPGA functional unit will be programmed with a hardware library so that the functional unit is available to be used by that process. Thus, an implementation of a scheduler for the FPGA unit is dependent in part on the nature of the FPGA unit and the one or more FPGAs it includes. Factors related to the FPGAs to be considered include, but are not limited to, the following. For example, in some cases an entire FPGA is refreshed to program a functional unit if one functional unit cannot be programmed independently of other functional units. Another consideration is the speed with which a functional unit can be programmed, and whether programming of a functional unit prevents other functional units from being used during that programming phase. Another factor to consider is whether processes can share a hardware library by sharing a functional unit. The scheduler also takes into account such factors as the number of concurrent processes, application performance guarantees, priority of applications, process context switching costs, access to memory and buses, and availability of software libraries if no functional unit is available within the FPGA unit.

There may be other instances where the FPGA unit provides a general purpose facility to applications or the operating system, which therefore are scheduled for the length of an application instantiation. For example, custom network protocols or offloading can be offered as an accelerated service on the FPGA unit. System calls or standard library calls, normally executed in a general purpose CPU, can be accelerated using the FPGA unit instead. Further, the operating system can multiplex the CPU based on preferences for process priority. In another instance, the operating system can use a profile of an application, generated statically or dynamically, to predict the functionality best suited for running on an FPGA unit and then pre-load that functionality so that it is available for scheduling. By using the profile as a guide, the operating system can ensure there is both space and time available on the FPGA unit to accelerate the application. Finally, the operating system can use simple hints from the application to know when to schedule time on the FPGA unit. For example, certain calls into the operating system (system calls) can denote long delays (calls to disk or the network), which provides a hint that the FPGA unit can be free for some amount of time for other threads or processes to use. Therefore, the operating system uses a variety of hints and preferences to create a schedule to multiplex access to the FPGA unit. Because the operating system controls the scheduler, it has detailed knowledge of executing and pending work, available hardware libraries, and time it takes to program an FPGA. Therefore, it can use this knowledge to determine which processes leverage the FPGA during execution.

Having now described a general overview of such computer architecture, an example implementation for updating the hardware libraries will now be described.

Figure 5:
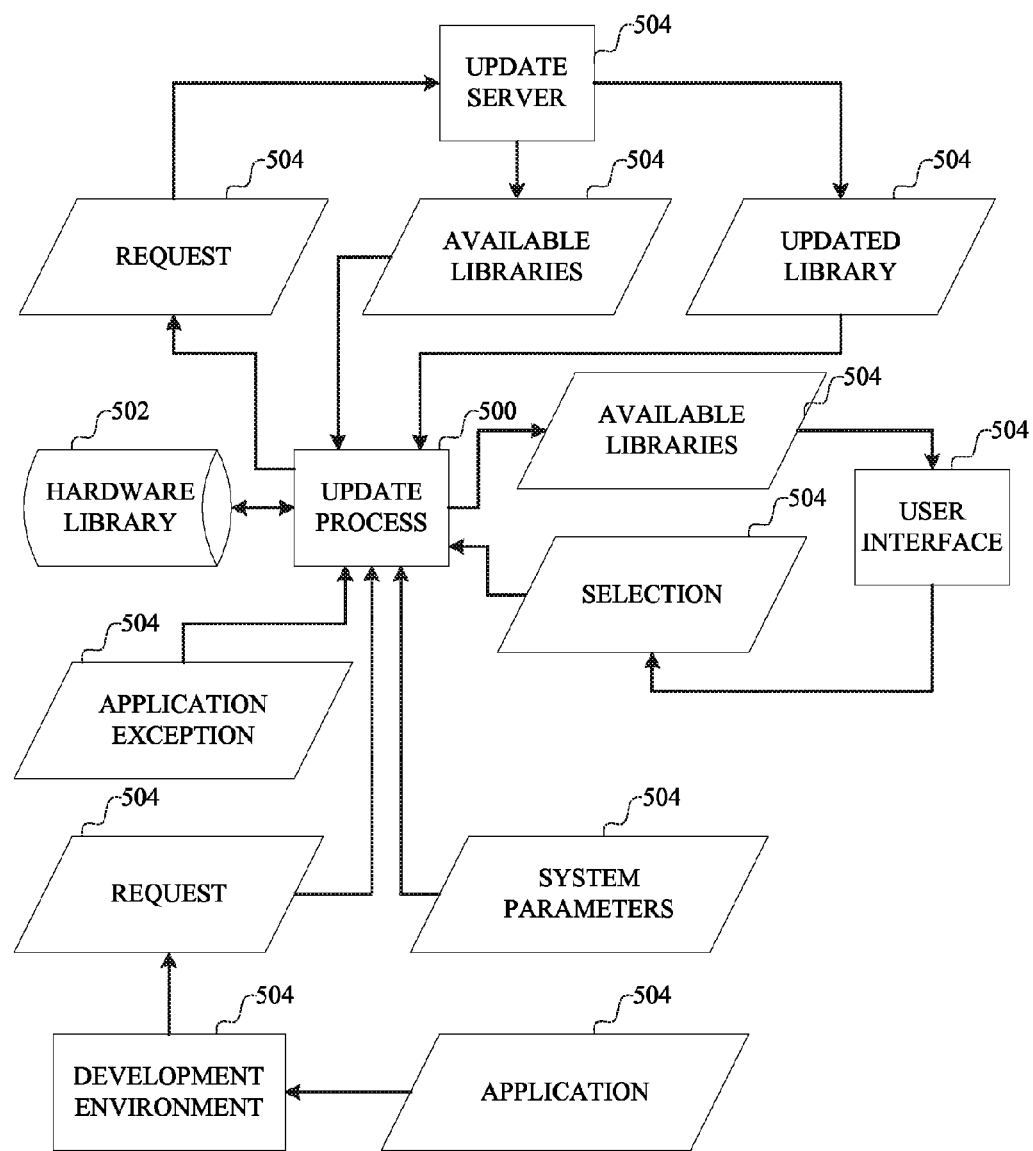
FIG. 5 is a data flow diagram illustrating an example implementation of a system for updating hardware libraries

Referring to FIG. 5, an update process 500 has access to a hardware library 502 which stores the code for implementing functions on the FPGA coprocessor. The update process 500 communicates with an update server 510 to receive, in some cases, information 504 describing available libraries, and in other cases, updated hardware libraries 506. The update server 510 can push information 504 and libraries 506 to the update process 500, or can provide such information upon receiving a request 508 from update server. The update process 500 can reside in the operating system of a host computer or can be a user-level service operating on the host computer. The update server 510 can be a separate server computer connected to the host computer over a computer network.

The update server also can be configured to be accessible not only by the update process, but also, or alternatively, through a conventional web browser or other user interface. The update server can provide one or more virtual storefronts as an interfaced through which hardware libraries can be made available for selection, sale and/or download to users. Such an interface can include information describing the library and pricing and other terms for downloading the library.

After the update process receives the information about available libraries, a list 512 of available libraries can be presented to a user for selection through a user interface 514. Through appropriate input devices in the user interface, the user can provide the update process an indication of a selection 516 of one or more libraries for download.

The update process can trigger a request for hardware libraries based on a variety of conditions. For example, code analysis could identify functions that are known to have corresponding hardware libraries. An application can trigger an exception when executed if a hardware library is unavailable or if an error occurs using it. In such a case, the operating system can attempt to handle the exception by using a corresponding software library if available. Alternatively, the operating system or application loader can make the decision about whether to dynamically link to a hardware or software library when the application is loaded. System parameters could be used to indicate whether a hardware library should be updated. Accordingly, as shown in FIG. 5, the update process can be triggered by application exceptions 518 and/or system parameters 520. Tools provided in a development environment 524 also could initiate a request 522 when an application 526 under development specifies or can use a hardware library. Some example implementations for requesting a hardware library follow.

The channel between the update process and the update server can be secured to ensure the update process is communicating with a legitimate update server. Similarly, libraries downloaded from the update server can be authenticated as being authored by a trusted source to improve security.

Figure 6:
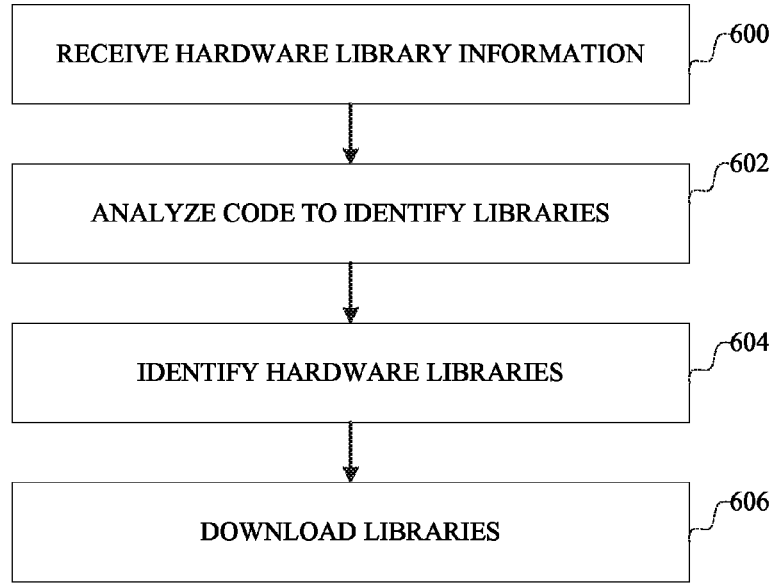
FIG. 6 is a flowchart illustrating an example implementation of requesting a hardware library based on code analysis.

FIG. 6 is a flowchart illustrating an example implementation of requesting a hardware library based on code analysis. Information about hardware libraries is received 600 into memory. Application code is received and analyzed 602 to identify references to one or more hardware libraries. In some instances, a reference to a library can permit implementation by a software or hardware library. Any libraries referenced in the application code that have a corresponding implementation, according to the received hardware library information, are identified 604. The identified hardware libraries then can be downloaded 606.

Figure 7:
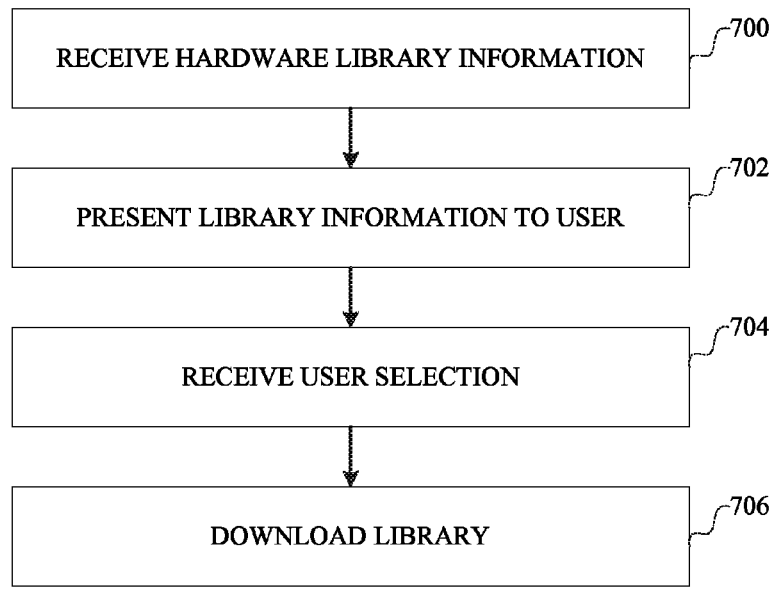
FIG. 7 is a flowchart illustrating an example implementation of requesting a hardware library based on user selection.
Figure 8:
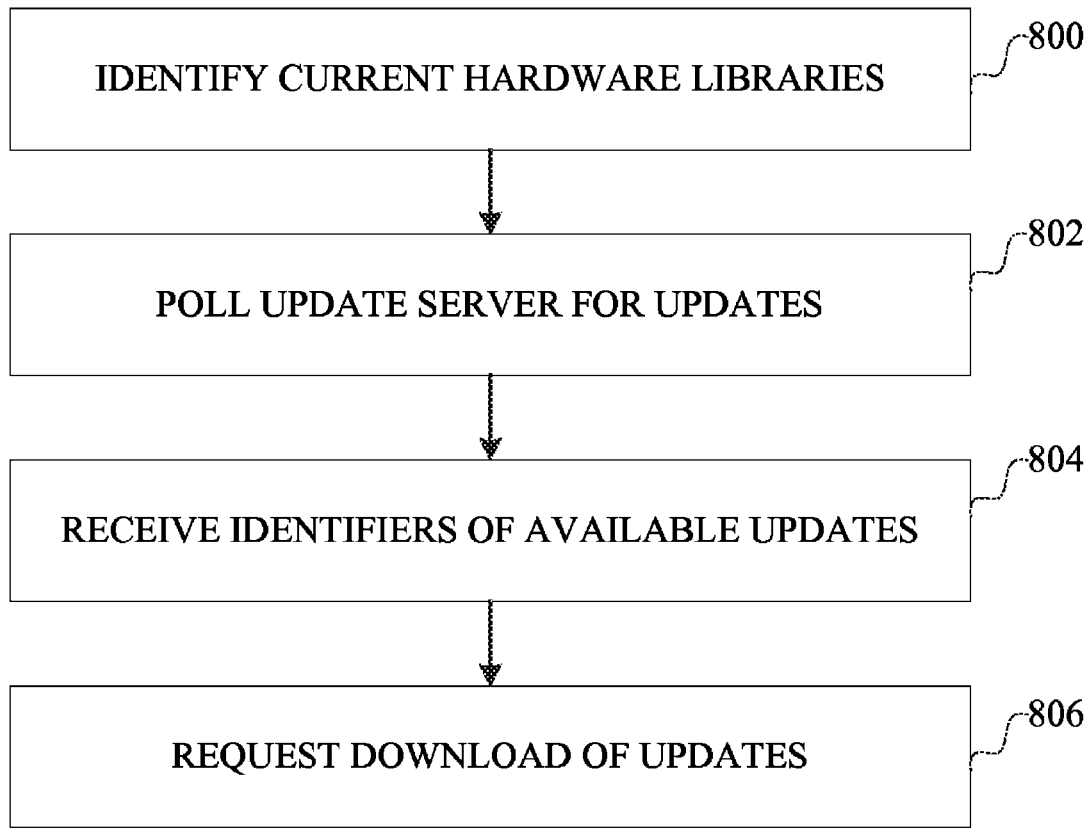
FIG. 8 is a flowchart illustrating an example implementation of requesting a hardware library based on polling an update server.

FIG. 7 is a flowchart illustrating an example implementation of requesting a hardware library based on user selection. Information about hardware libraries is received 700 into memory. A list or other formatted view of this information is presented 702 to the user, from which the user is allowed to make a selection. If a selection from the user is received 704, then the identified hardware library can be downloaded 706. The hardware library also can be advertised to provide an improved user experience and therefore warrant an upgrade which can be purchased or licensed and downloaded, whether for a fee or for free of compensation FIG. 8 is a flowchart illustrating an example implementation of requesting a hardware library based on polling or receiving a notification from an update server. In particular, the update process first identifies 800 currently used hardware libraries, such as stored in 502 in FIG. 5. The update server is then polled 802, given identifiers of the hardware libraries. The update server determines whether there are any updates related to the hardware libraries identified to it. The update process then receives (804) information about any available updates to the hardware libraries. These updates then can be requested 806 for download.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process comprising:
   receiving into memory, from a hardware library store, information describing hardware libraries, the hardware libraries storing code used in a computer system to program a field programmable gate array (FPGA) to perform operations requested by one or more applications;
   receiving into memory, from an update server, information describing updates to the hardware libraries used to program the FPGA;
   updating the hardware libraries within the hardware library store according to the information received from the update server describing the updates;
   determining, at least in part from information regarding functionality of the one or more applications, that the FPGA is to be programmed with at least one of the updated hardware libraries; and
   programming the FPGA with the at least one of the updated hardware libraries.

2. The computer-implemented process of claim 1, wherein receiving information describing updates comprises:
   sending a request to the update server for updates to a set of hardware libraries; and
   receiving information describing available updates for the set of hardware libraries from the update server.

3. The computer-implemented process of claim 2, wherein receiving information describing updates comprises:
   sending the request in response to an application exception indicating failure of execution of a hardware library.

4. The computer-implemented process of claim 2, wherein receiving information describing updates comprises:
   sending the request in response to system parameters specifying a time to update a hardware library.

5. The computer-implemented process of claim 2, wherein receiving information describing updates comprises:
   sending the request in response to a development environment indicating usage of a hardware library in an application.

6. The computer-implemented process of claim 1, further comprising:
   presenting information describing available updates to a user; and
   receiving an indication of a selection from among the available updates from the user.

7. The computer-implemented process of claim 6, wherein the information presented to the user is presented in a virtual storefront providing an interface including information describing the library and pricing and other terms for downloading the library.

8. A computer program product comprising:
   a physical computer readable hardware storage device; and
   computer program instructions stored on the hardware storage device that, when processed by a computer, instruct the computer to perform a process comprising:
      receiving into memory, from a hardware library store, information describing hardware libraries, the hardware libraries storing code used in a computer system to program a field programmable gate array (FPGA) to perform operations requested by one or more applications;
      receiving into memory, from an update server, information describing updates to the hardware libraries used to program the FPGA;
      updating the hardware libraries within the hardware library store according to the information received from the update server describing the updates;
      determining, at least in part from information regarding functionality of the one or more applications, that the FPGA is to be programmed with at least one of the updated hardware libraries; and
      programming the FPGA with the at least one of the updated hardware libraries.

9. The computer program product of claim 8, wherein receiving information describing updates comprises:
   sending a request to the update server for updates to a set of hardware libraries; and
   receiving information describing available updates for the set of hardware libraries from the update server.

10. The computer program product of claim 9, wherein receiving information describing updates comprises:
    sending the request in response to an application exception indicating failure of execution of a hardware library.

11. The computer program product of claim 9, wherein receiving information describing updates comprises:
    sending the request in response to system parameters specifying a time to update a hardware library.

12. The computer program product of claim 9, wherein receiving information describing updates comprises:
    sending the request in response to a development environment indicating usage of a hardware library in an application.

13. The computer program product of claim 8, further comprising:
    presenting information describing available updates to a user; and
    receiving an indication of a selection from among the available updates from the user.

14. The computer program product of claim 13, wherein updating the hardware libraries comprises updating hardware libraries according to the selection from the user.

15. A computing machine, comprising:
    a hardware library store comprising a collection of hardware libraries accessible to the computing machine, the hardware libraries storing code used in the computing machine for programming a field programmable gate array (FPGA) to perform operations requested by one or more applications;
    an update process component configured to:
       receive into memory, from the hardware library store, information describing the hardware libraries used to program the FPGA;

receive into memory, from an update server, information describing updates to the hardware libraries used to program the FPGA;

update the hardware libraries within the hardware library store according to the information received from the update server describing the updates;

determine, at least in part from information regarding functionality of the one or more applications, that at least one of the updates to the hardware libraries is to be programmed into the FPGA; and program the FPGA with the at least one of the updated hardware libraries.

16. The computing machine of claim 15, wherein the update process component is configured to:

send a request to the update server for updates to a set of hardware libraries; and receive information describing available updates for the set of hardware libraries from the update server.

17. The computing machine of claim 16, wherein the update process component is configured to:

receive application exceptions indicating failure of execution of a hardware library; and send the request in response to an application exception indicating failure of execution of a hardware library.

18. The computing machine of claim 16, wherein the update process component is configured to:

access system parameters specifying times to update hardware libraries; and send the request in response to occurrence of a time to update a hardware library.

19. The computing machine of claim 16, wherein the update process component is configured to:

receive information from a development environment indicating usage of hardware libraries in applications; and send the request in response to information received from the development environment indicating usage of a hardware library.

20. The computing machine of claim 16, wherein the update process component is configured to:

receive information from an application loader that determines at application load time whether to load a library; and send the request in response to information received from the loader.

\* \* \* \* \*